US008526686B2

(12) United States Patent
Gavita (10) Patent No.: US 8,526,686 B2
(45) Date of Patent: Sep. 3, 2013

(54) DYNAMIC PROFILE CREATION IN RESPONSE TO FACIAL RECOGNITION

(75) Inventor: Edoardo Gavita, Laval (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 134 days.

(21) Appl. No.: 12/978,505

(22) Filed: Dec. 24, 2010

(65) Prior Publication Data

US 2012/0163679 A1    Jun. 28, 2012

(51) Int. Cl.
*G06K 9/00* (2006.01)
*G06K 9/54* (2006.01)
*G06F 3/00* (2006.01)

(52) U.S. Cl.
USPC ............ 382/118; 382/168; 382/305; 715/700

(58) Field of Classification Search
USPC ................. 382/118, 100, 115, 116, 168, 171, 382/172, 173, 181, 190, 305; 709/203, 205, 709/200, 202, 206; 704/200, E17.003, E19.008; 715/716, 234, 207, 257, 700, 209, 210, 206; 707/999.104, E17.005, 999.002, 999.004, 707/999.003, 999.005; 370/216, 351, 389, 370/400, 410, 395.1
See application file for complete search history.

(56) References Cited

U.S. PATENT DOCUMENTS

| 4,630,225 | A | * | 12/1986 | Hisano | 702/153 |
|---|---|---|---|---|---|
| 6,636,259 | B1 | * | 10/2003 | Anderson et al. | 348/211.3 |
| 7,050,607 | B2 | * | 5/2006 | Li et al. | 382/118 |
| 7,324,671 | B2 | * | 1/2008 | Li et al. | 382/118 |
| 7,418,116 | B2 | * | 8/2008 | Fedorovskaya et al. | 382/118 |
| 7,526,106 | B1 | * | 4/2009 | Clark et al. | 382/116 |
| 7,551,755 | B1 | * | 6/2009 | Steinberg et al. | 382/118 |
| 8,117,252 | B2 | * | 2/2012 | Schaff | 709/200 |
| 2007/0211921 | A1 | | 9/2007 | Popp et al. | |
| 2009/0300671 | A1 | | 12/2009 | Scott et al. | |
| 2010/0157129 | A1 | | 6/2010 | Lee | |
| 2011/0038512 | A1 | * | 2/2011 | Petrou et al. | 382/118 |

FOREIGN PATENT DOCUMENTS

WO    02/32136 A2    4/2002

OTHER PUBLICATIONS

International Search Report for PCT/IB2011/055990, mailing date of Apr. 3, 2012; 5 pages.

\* cited by examiner

*Primary Examiner* — Sheela Chawan
(74) *Attorney, Agent, or Firm* — Dilip C. Andrade (57) ABSTRACT

The use of an image capture device with a IPTV Set Top Box allows for the STB to detect a plurality of viewers, and to then provide access conditions that are appropriate to the detected viewers. In cases where a viewer has not been profiled this may include creating a profile for the user, while in cases where a plurality of users are detected, a set of access rights and permissions determined in accordance with the plurality of users can be provided.

13 Claims, 10 Drawing Sheets

DYNAMIC PROFILE CREATION IN RESPONSE TO FACIAL RECOGNITION

TECHNICAL FIELD

This disclosure relates generally to user validation and profile access based on the presence of a plurality of users.

BACKGROUND

In an Internet Protocol Television (IPTV) environment, as in many other similar fields), users can be provided with the ability to log in (in some implementations users are required to log in) to access the account. In addition to an account validation, each account can have a plurality of users associated with it, each user having an individual log in. By creating profiles for different users, the account administrator (who is in the context of this discussion one of the users that is responsible for setting up accounts) can create profiles associated with each of the users that can be used to restrict access to content.

Typically logging in to an IPTV environment involves interacting with either the IPTV Set Top Box (STB) or both the IPTV STB and network elements. This is commonly done by entering a pass phrase as will be discussed in more detail below. This is often difficult for some users, and cumbersome for most users. It also does not account for the presence of more than a single user at any time. Thus if two account holders, a parent and a child for example, are both present, one of the two accounts must be used. If the account with the most restrictions is used, the other account holder cannot typically override the content filtering without logging in to the system, which may then provide access to some content that would preferably not be shown. The only prior art remedy is to create a third account that would then be used for the two account holders when together. This is cumbersome and creates administrative problems that are preferably avoided.

Figure 1:
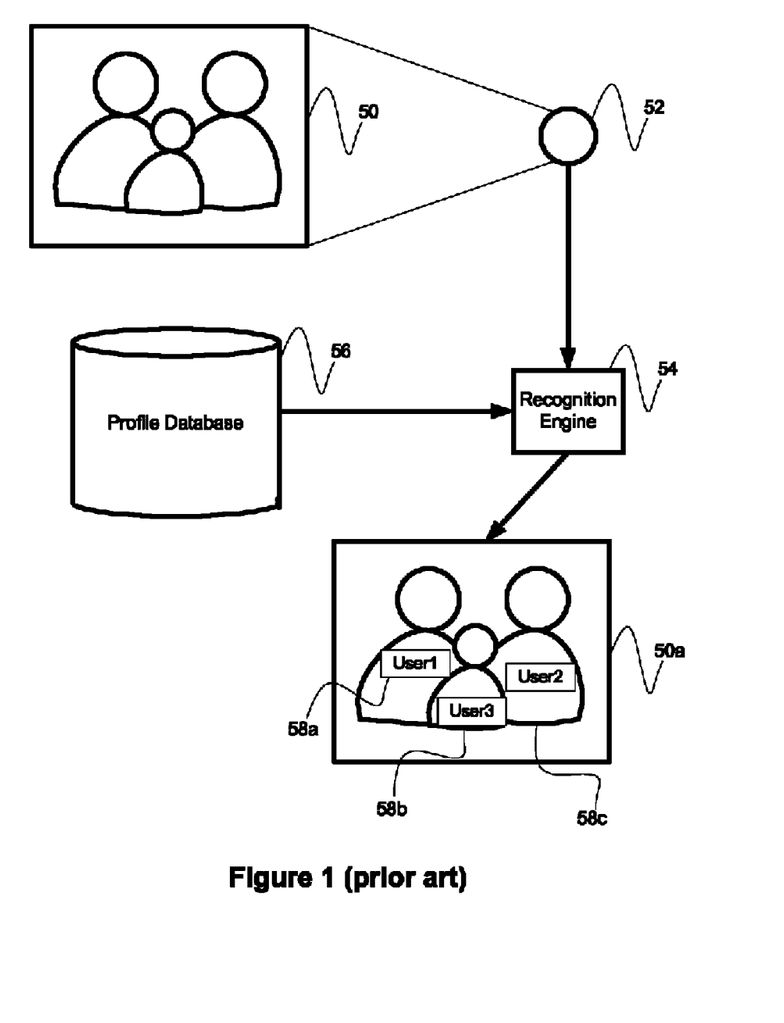
FIG. 1 is a block diagram figure illustrating recognition of faces in a photograph.

In an unrelated art field, image processing has allowed for individuals in photographs to be identified based on facial characteristics. As illustrated in FIG. 1, a photograph with three people in it is captured by capture device 52, and is then passed to a recognition engine 54. Recognition engine 54 can isolate the faces in the photograph with sufficiently high accuracy, and can then compare the facial features of each identified face to the contents of profile database 56. Based on the contents of the profile database 56, recognition engine 54 can modify photograph 50 to produce photograph 50a which includes metadata identifying each of user1 58a, user2 58b and user3 58c. These features can be performed by some cameras, some camera phones, and by many computers.

Figure 2:
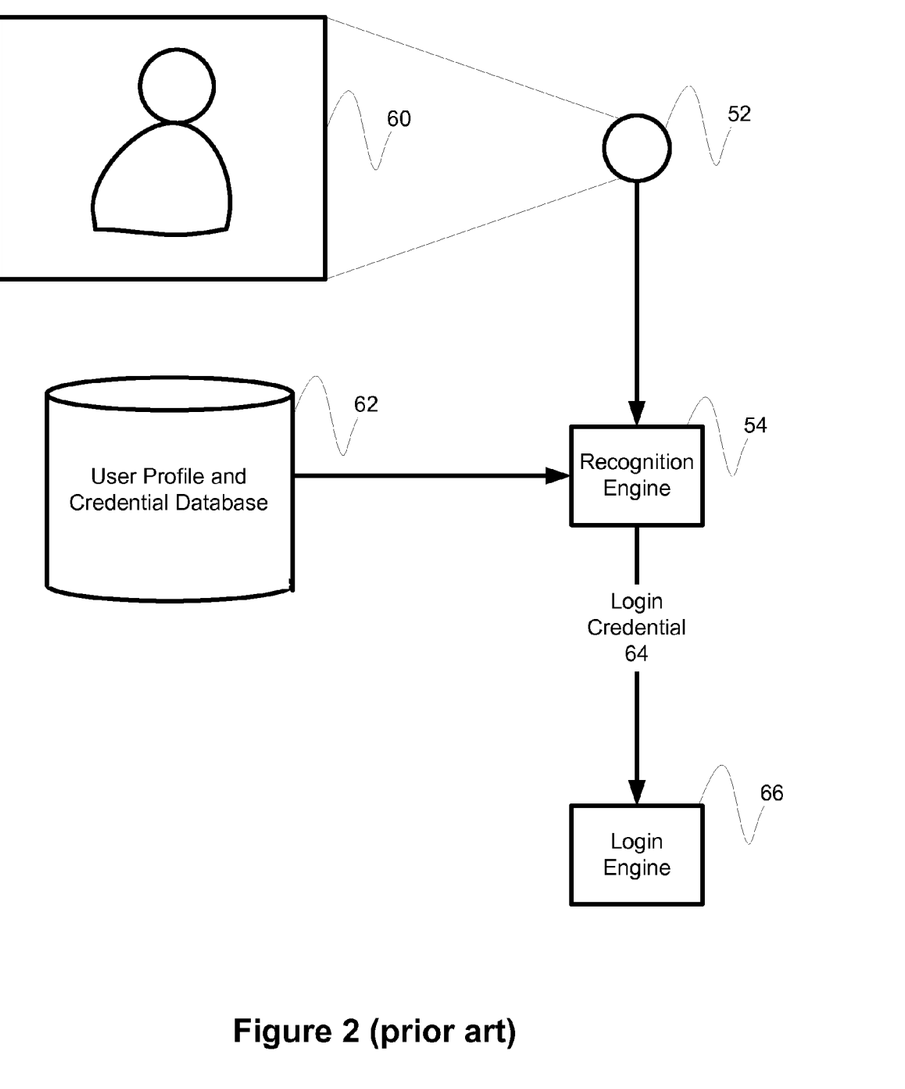
FIG. 2 is a block diagram figure illustrating a user login based on facial recognition.

In the field of computer security, it is known that a biometric reading, including a facial recognition scan, can be used as a login credential into some computing systems. FIG. 2 illustrates such an embodiment. A photograph of a user 60 is captured by capture device 52 and provided to recognition engine 54. Recognition Engine 54 access content in user profile and credential database 62, to identify the user in photograph 60 and then provides the login credential 64 associated with that user to login engine 66. At this point the user is able to login to the computer system.

Figure 3:
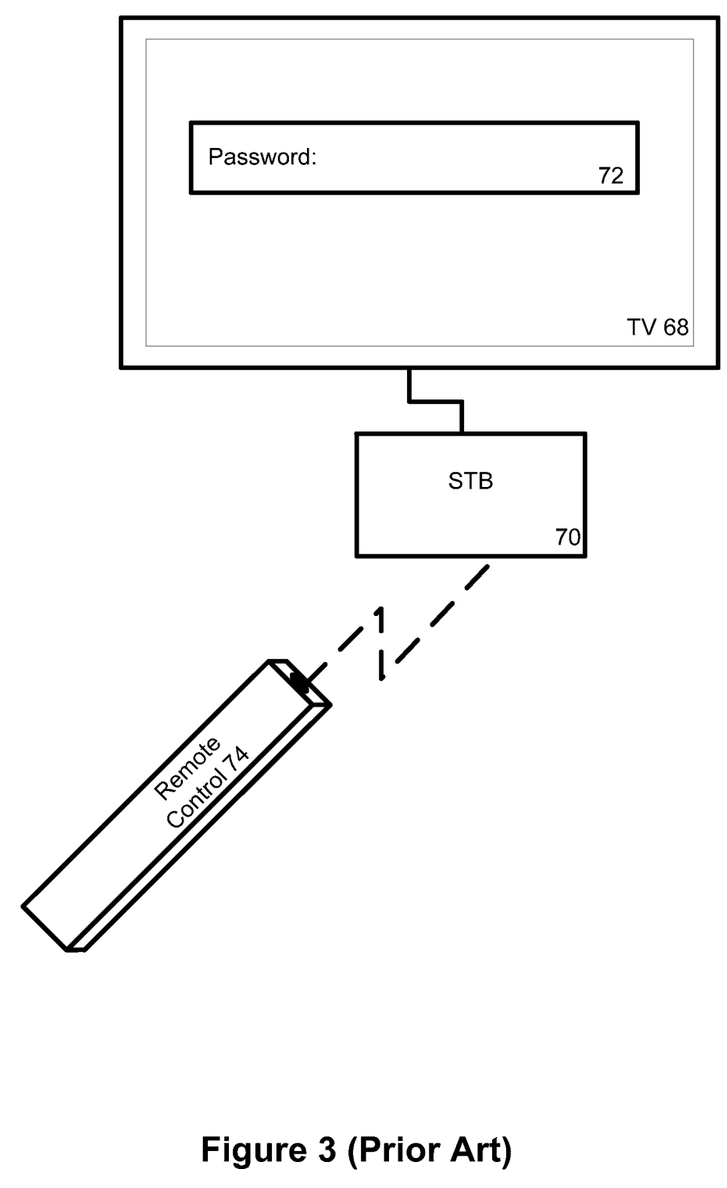
FIG. 3 is a block diagram illustrating a convention IPTV STB login process.

As discussed above, in a conventional IPTV environment, a user interacts with an STB 70 connected to a display 68. The STB 70 provides a login prompt 72 on display 68. The user makes use of remote control 74 to provide a pass phrase, or typically a Personal Identification Number (PIN). The PIN, as discussed above, is an account specific login credential that is then used to validate the user and provide access to an account. In some embodiments, the user is requested to select a login from a menu and is then prompted for the PIN.

At present logging in to an IPTV STB is done with a user specific credential, and requires that a controller with a form factor limited input mechanism is employed. This is far from ideal. Therefore, it would be desirable to provide a system and method that obviate or mitigate the above described problems

SUMMARY

It is an object of the present invention to obviate or mitigate at least one disadvantage of the prior art.

In a first aspect of the present invention there is provided a method of user account administration. The method comprises receiving an image from an image capture device, the image containing at least two faces; determining, in accordance with stored user profiles, that the received image includes both a first user having the ability to create new user profiles, and a second user without a user profile; creating a new user profile; and assigning the new user profile to the second user.

In an embodiment of the first aspect of the present invention, the step of determining includes employing facial recognition processes on the received image in conjunction with facial recognition patterns associated with each of the stored user profiles. Optionally, the step of assigning the new user profile includes the step of modifying the user profile to include facial recognition patterns associated with the image of the second user. In another embodiment, the step of creating a new user profile is preceded by the step of prompting the first user to approve the creation of a new user profile.

In a further embodiment, the step of creating the new user profile includes assigning the new profile generic characteristics. Optionally, the method can further include the step of prompting the first user to modify the created profile. The profile can also be modified to include content access permissions or demographic information associated with the second user.

In a second aspect of the present invention, there is provided a user account administration management system. The system comprises a profile processor having a communications interface and a database interface. The communications interface receives an indication identifying a plurality of users. The database interface retrieves profiles associated with each of the users in the identified plurality from a user profile database. The profile processor determines that a first user in the plurality is associated with a profile having permission to create new user profiles for storage in the user profile database, and that a second user in the plurality is not associated with a profile in the user database, and creates a profile in the user profile database associated with the second of the users.

In an embodiment of the second aspect of the present invention, the system further includes the user profile database which stores profiles associated with users. In an alternate embodiment, the database interface is operatively connected to a communications network for remotely accessing the user profile database.

In another embodiment, the system further includes a recognition engine for receiving an image of a plurality of users from an image capture device, for generating an indication identifying the plurality of users in accordance with facial recognition patterns stored in association with the stored profiles in the user profile database and the received image and for forwarding the generated indication to the profile processor. Optionally, the image capture device is connected to another device in communication with the recognition engine.

In a further embodiment, the communications interface is operatively connected to a communications network for communicating with a recognition engine remotely located from the permission management system.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

The present invention is directed to a system and method for the generation of and log in using multi-user accounts.

Reference may be made below to specific elements, numbered in accordance with the attached figures. The discussion below should be taken to be exemplary in nature, and not as limiting of the scope of the present invention. The scope of the present invention is defined in the claims, and should not be considered as limited by the implementation details described below, which as one skilled in the art will appreciate, can be modified by replacing elements with equivalent functional elements.

As IPTV features are enhanced, many functions are being provided that are often not thought of as television related. One such feature is video-chatting or video-conferencing using the display attached to the IPTV STB. A camera is provided that interacts with the STB, and allow the user to capture images and video and to share them with other IPTV users. This is increasing the number of STB's and televisions that have access to an image capture device. Typically this image capture device is oriented so that a field of view similar to the preferred viewing angles of the television is provided to the camera (often by placing the camera in the bezel of the display). One side effect is that the people watching the television can then be seen by the camera.

In the present invention, the image capture device (typically referred to as a camera) is employed as a user login and validation interface. However, instead of encountering confusion when one or more users are present, the STB determines an access level that is appropriate for the users present. This can be achieved in one of a number of fashions, as will be discussed below. Additionally, when multiple viewers are identified, a registered user (in some embodiments only the administrator) can be prompted to create a profile for any users not known in the image. This facilitates a simpler user recognition system.

Figure 4:
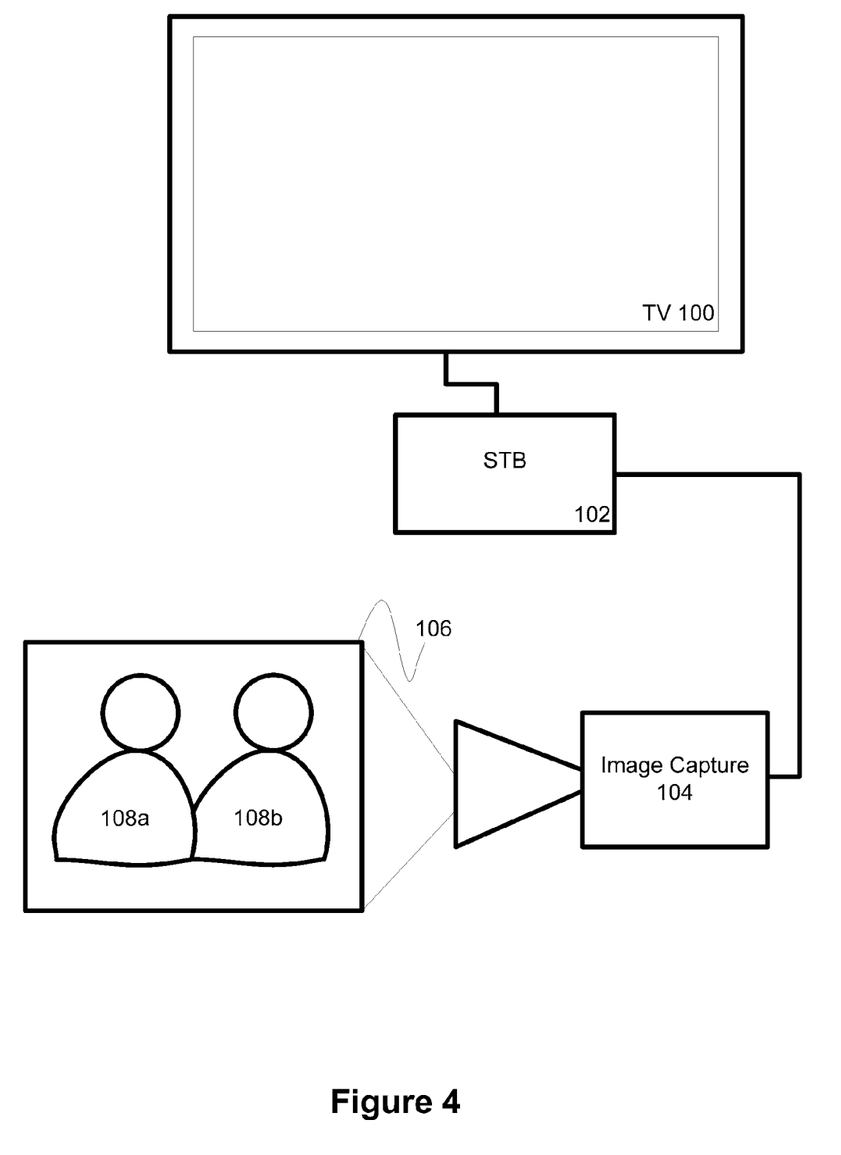
FIG. 4 is a block diagram illustrating a multi-user login system.

FIG. 4 illustrates a basic configuration of a system as discussed above. A display 100 is connected to a STB 102, which is connected to an image capture device 104. One skilled in the art will appreciate that the image capture device 104 can be integrated into the display 100, or connected to the STB 102 through display 100.

Image capture device 104 captures image 106 having two people 108a and 108b in the image. This image is passed to STB 102. In some embodiments the identification of the users is done in advance of other processing, and is performed either at the capture device 104, or at the STB 102. In other embodiments, the image can be sent to an IPTV network element, such as a Resource and Admission Control node, for processing. Transmitting the image to the network is preferably done only in embodiments where the user validation and login is performed in the network and not in the STB 102.

Upon determining the identities of the viewers 108a and 108b, STB can provide a level of access that is determined in accordance with the two users. In some embodiments, if the two users both have profiles, the more restrictive set of permissions is used, whereas in other embodiments the less restrictive set of permissions is used. In other embodiments, which will be discussed later, permissions and access can be based on conditions set in the user profiles to recognize conditions where one user is present with either a specific user or a class of users.

Figure 5:
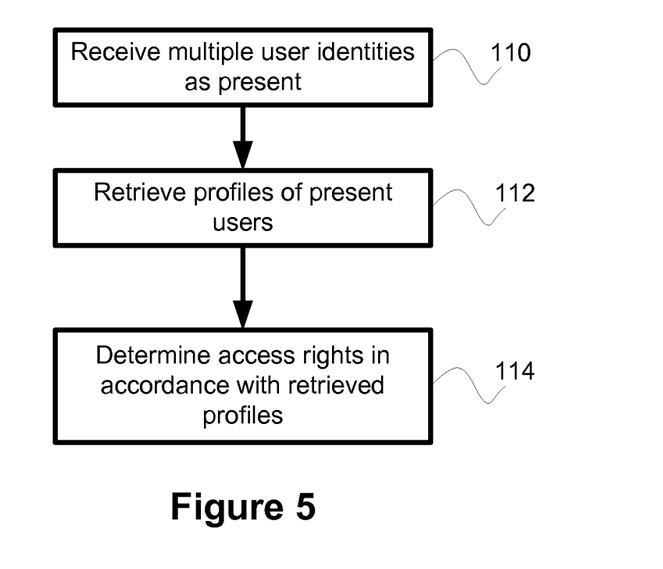
FIG. 5 is a flow chart illustrating a method of user validation.

FIG. 5 illustrates a method of the present invention. In step 110, multiple user identities are received indicating their presence. In step 112, the profiles of the present users are retrieved, and in step 114, the access rights and permissions are determined in accordance with the retrieved profiles. One skilled in the art will appreciate that this process can be performed either at the STB or at a network node without departing from the scope of the present invention. As long as two profiles are authenticated as a part of, or as a precursor to, step 110, the rest of the method can be performed.

Figure 6:
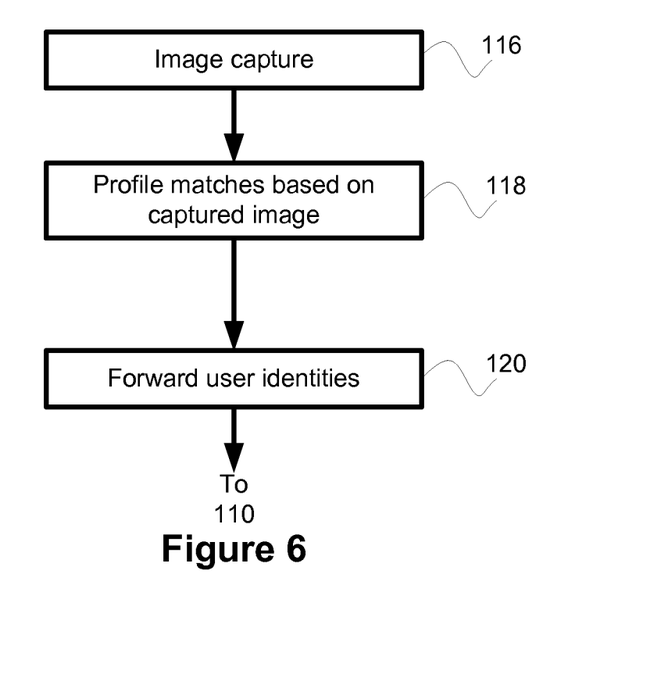
FIG. 6 is a flow chart illustrating an embodiment of the method of FIG. 5.

In FIG. 6, further precursor steps to step 110 are shown. In step 116, an image or a video is captured. Based on the captured image or video, profiles are matched to the detected users in step 118. The user identities, and any credentials required for further processing are then forwarded in step 120 and the process continues with step 110. One skilled in the art will appreciate that the step of capturing video in 116 must be performed at or near the STB, but all other steps can be performed either in the STB or in the network nodes.

Figure 7A:
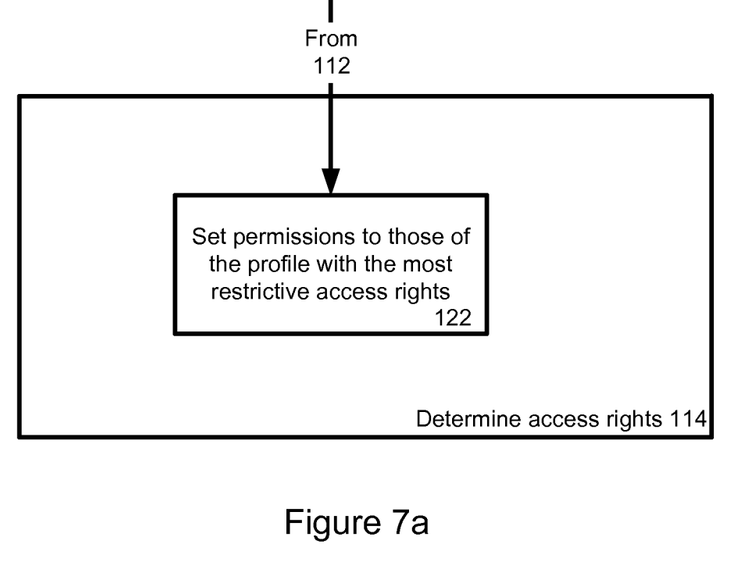
FIG. 7 is a flow chart illustrating an embodiment of the method of FIG. 5.
Figure 7B:
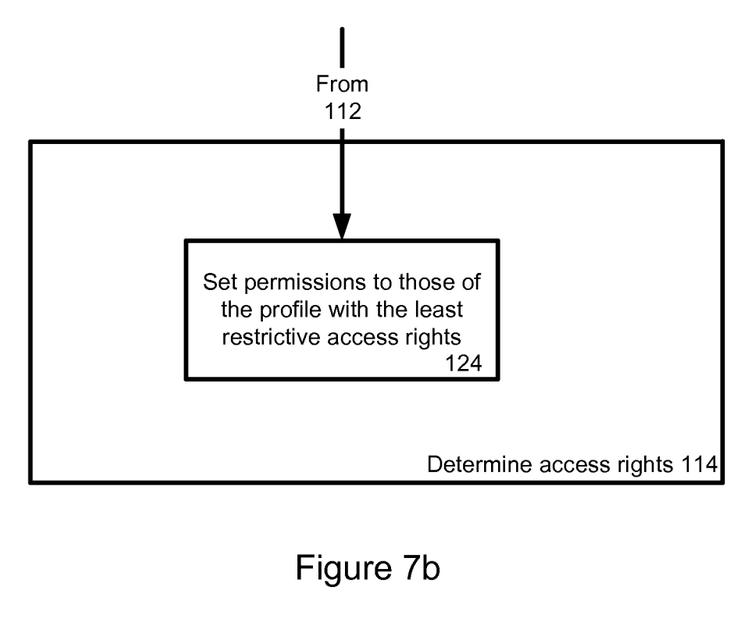

Step 114 of FIG. 5 can be performed in a number of different ways as was mentioned above. In FIG. 7a, upon completion of step 112, the step of determining access rights in step 114 includes setting access rights to the permissions associated with the more restrictive profile. This means that when a parent and child are both watching television, the chances of the child accidentally watching inappropriate content are greatly reduced. If, however, the parent wants full access to content in the presence of a child, the method of FIG. 7b can be employed. In place of step 122, step 124 is performed and the access rights are set in accordance with the least restrictive set of permissions. This allows the parent to determine what content is appropriate for the child on a case by case basis.

Figure 8:
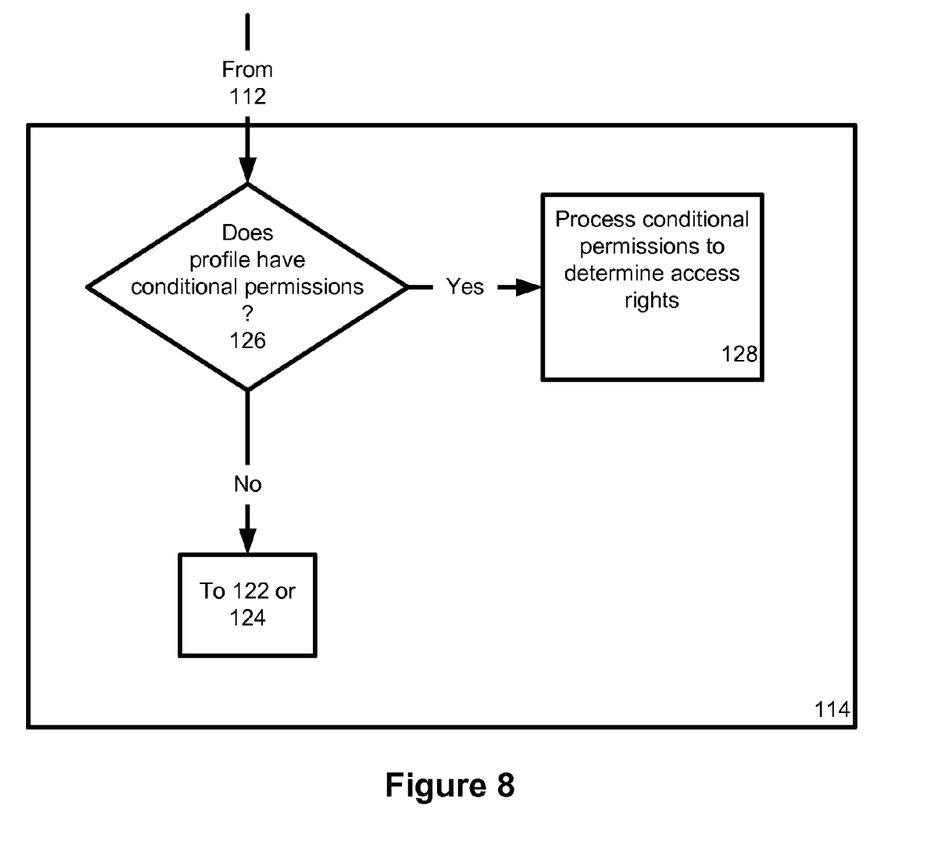
FIG. 8 is a flow chart illustrating an embodiment of the method of FIG. 5.

In a further embodiment, the set of permissions associated with a user can be made conditional. This allows a child's profile to be very restrictive when the child is alone in front of the television, and more liberal in the presence of another user. Such a method is illustrated in FIG. 8. In step 114 a further decision is made. In step 126, the determination of whether or not one of the profiles has conditional permissions is made. If no conditional permissions are present, then the process can continue to either step 122 or 124. If conditional permissions are present in the profile, the process continues to step 128 where the conditional permissions are processed to determine the access rights.

Conditional permissions can be set in any number of ways. A child's allowed content may be very restricted alone, less restricted in the presence of a profiled adult, and even less restrictive in the presence of a particular user (such as a parent). The presence of the parent can provide access to content either for the duration that the parent is present, or for a buffer period following. The buffer period can be a fixed duration of time (so that programming is not locked if the parent leaves the room briefly), or for the length of a program. Other variations can be permitted as well.

Figure 9:
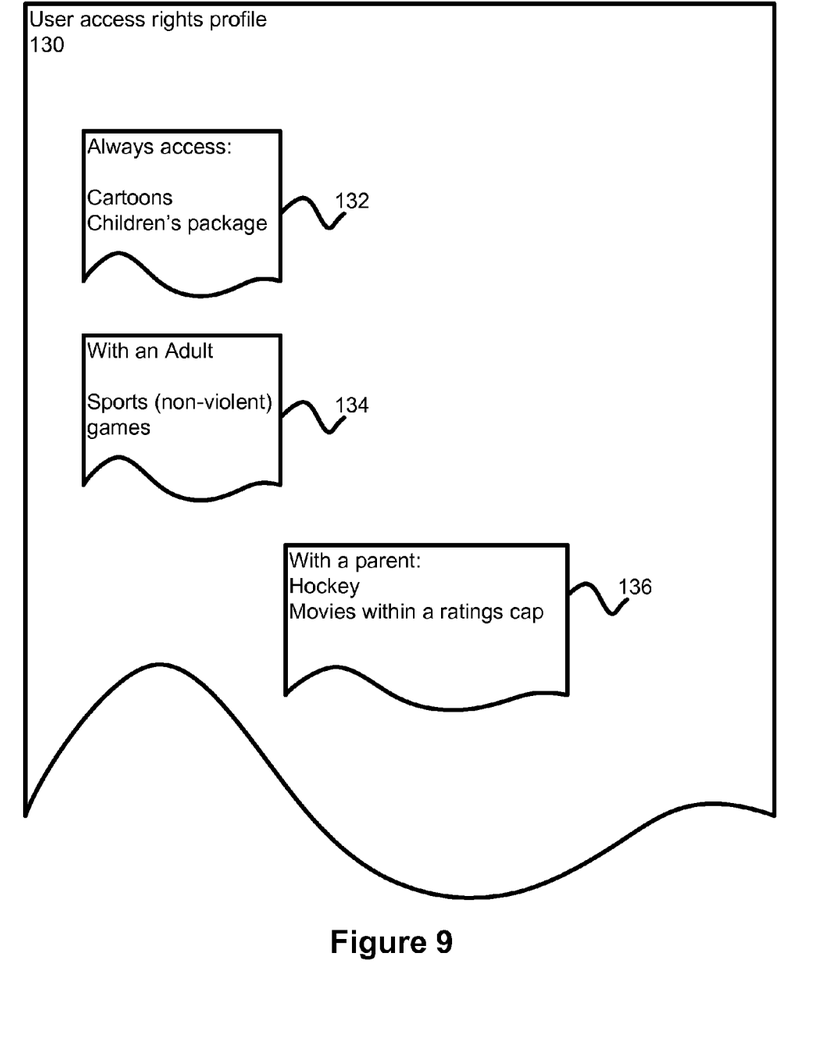
FIG. 9 is a block diagram illustrating a user profile for a multi-user login system.

FIG. 9 illustrates an exemplary embodiment of a profile 130 with conditional permissions. When the profiled user is alone, a set of permissions 132 allows the user access to all channels in a children's programming package as well as any other content flagged as a cartoon. If the user is determined to be in the presence of an adult, a set of permissions 134 allows access to sports without violent content and IPTV content such as games. In the presence of a specified user, such as a father, the set of permissions 136 expands to include hockey, but not other sports with violent content, and movies that fall below a specified ratings level.

Figure 10:
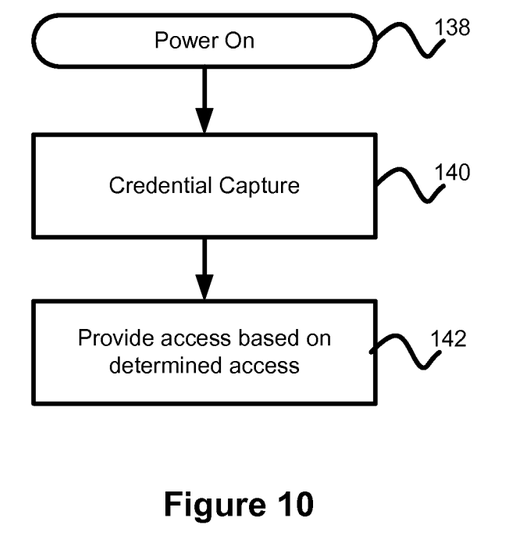
FIG. 10 is a flow chart illustrating a method of the present invention.

In FIG. 10 another manner of viewing the above described processes is presented. In step 138, the set top box is initialized. In step 140 the credentials of the present users are captured for processing and in step 142, access based on determined access rights is provided. Following step 142, the process can return to step 140 so that the permissions can change when a new user is detected. This would allow adults to be watching a violent or otherwise unsuitable content for a child, and then have the system lock out the content when a child enters the viewing area. When content is locked out, it can be paused and replaced with other content, or a blank screen. In some embodiments a barker channel can be displayed advertising network features, and explaining why the content has been blocked. The adult can then be provided with the ability to provide a one time override to the restriction.

Figure 11:
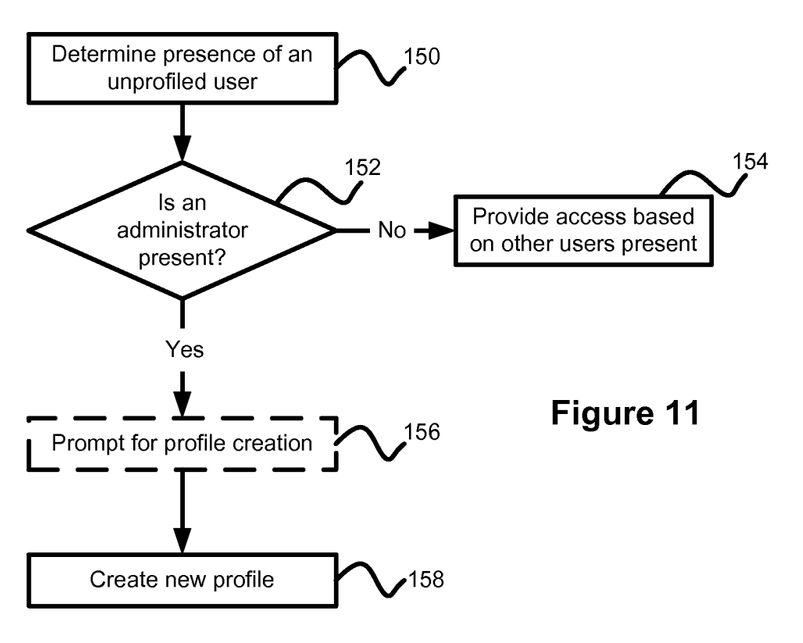
FIG. 11 is a flow chart illustrating a method of account creation.

In the above discussion, focus has been paid to determining access rights based on detecting a plurality of registered users. Creating user profiles is often a time consuming and difficult process. Because users with no profile will not be recognized as users of the STB, the detection of a face that does not match to a known profile can be used during the profile creation process. FIG. 11 illustrates one such method. In step 150, the presence of an unprofiled user is detected. One skilled in the art will appreciate that if all users have facial recognition patterns associated with their profiles, any non-matched but detected face can be assumed to be an unprofiled user.

In step 152 a determination is made about the presence of an administrator or other user that can create profiles. If no such user is present, access based on the recognized users that are present, or access based on a "minimal" pre-defined set of criteria, is provided. If an administrator is present a new profile is created in step 158. This can optionally be preceded by a step of prompting the administrator to confirm the creation of the new profile. This prompt can be intrusive or be designed to blend into the background.

When a profile is created, it can be created as a generic profile that is then presented for modification, or the administrator can be offered a number of different options to effectively add the user to a particular class of user. The richer the information provided about each user and stored in the associated profile, the more variety can be added to the conditions in the conditional profiles discussed above.

Figure 12:
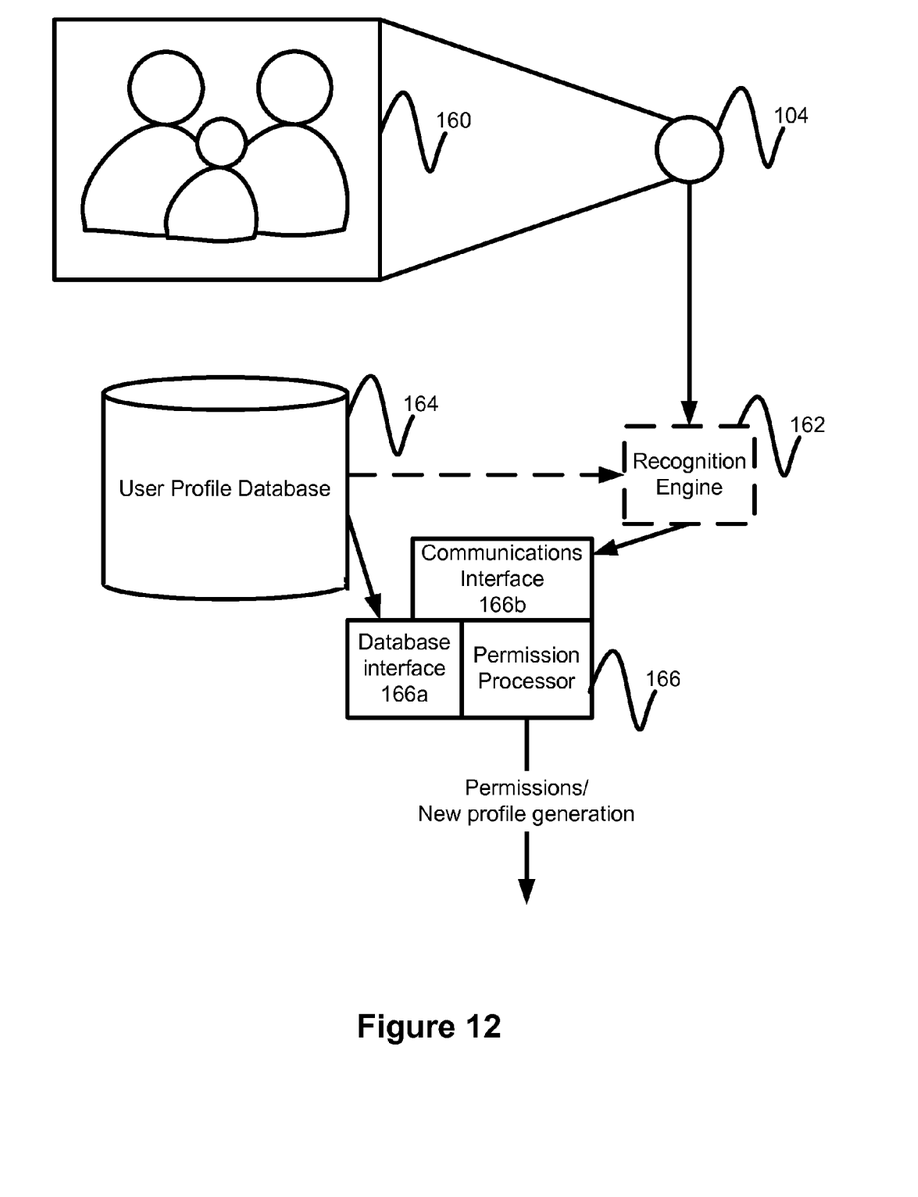
FIG. 12 is a block diagram illustrating an exemplary system of the present invention.

FIG. 12 illustrates an exemplary embodiment of the present invention in block diagram form. An image 160 is captured by capture device 104 and is provided to recognition engine 162. Recognition engine makes use of facial recognition patterns associated with the user profiles stored in User Profile Database 164. An indication of the users detected in the captured image is provided to Permission Processor 166. Permission processor 166 determines the permissions and access rights that are available based on the detected viewers. As noted above, if a plurality of profiled users are present, the permission processor can determine the permissions and access rights according to either conditional permissions set in profiles, or based on rules that apply to all profiles. In other embodiments, permission processor can determine, in the presence of an unprofiled viewer, that another viewer has sufficient permissions to create a profile for the unprofiled viewer.

One skilled in the art will appreciate that recognition engine 162 is not necessary for the function of the system, so long as permission processor receives a indication that a plurality of viewers are present. Preferably the indication includes identification of the users in the plurality, but this can be obtained separately if need be.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine-readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of user account administration, the method comprising:

receiving an image from an image capture device, the image containing at least two faces;

determining, in accordance with stored user profiles, that the received image includes both a first user having the ability to create new user profiles, and a second user without a user profile;

creating a new user profile and assigning the created profile generic characteristics; and assigning the new user profile to the second user.

2. The method of claim 1 wherein the step of determining includes employing facial recognition processes on the received image in conjunction with facial recognition patterns associated with each of the stored user profiles.

3. The method of claim 2 wherein the step of assigning the new user profile includes the step of modifying the user profile to include facial recognition patterns associated with the image of the second user.

4. The method of claim 1 wherein the step of creating a new user profile is preceded by the step of prompting the first user to approve the creation of a new user profile.

5. The method of claim 1 further including the step of prompting the first user to modify the created profile.

6. The method of claim 5 further including the step of modifying the profile to include content access permissions.

7. The method of claim 5 further including the step of modifying the profile to include demographic information associated with the second user.

8. A user account administration management system comprising:

a profile processor having:

a communications interface for receiving an indication identifying a plurality of users, a database interface for retrieving profiles associated with each of the users in the identified plurality from a user profile database and for determining that a first user in the plurality is associated with a profile having permission to create new user profiles for storage in the user profile database, and that a second user in the plurality is not associated with a profile in the user database, and for creating a profile in the user profile database associated with the second of the users, the created profile being assigned generic characteristics.

9. The user account administration management system of claim 8 further including the user profile database, the user profile database for storing profiles associated with users.

10. The user account administration management system of claim 8 wherein the database interface is operatively connected to a communications network for remotely accessing the user profile database.

11. The user account administration management system of claim 8 further including a recognition engine for receiving an image of a plurality of users from an image capture device, for generating an indication identifying the plurality of users in accordance with facial recognition patterns stored in association with the stored profiles in the user profile database and the received image and for forwarding the generated indication to the profile processor.

12. The user account administration management system of claim 11 wherein the image capture device is connected to another device in communication with the recognition engine.

13. The user account administration management system of claim 8 wherein the communications interface is operatively connected to a communications network for communicating with a recognition engine remotely located from the permission management system.

* * * * *